(12) United States Patent
Matsushita et al.

(10) Patent No.: US 11,815,141 B2
(45) Date of Patent: Nov. 14, 2023

(54) DISK BRAKE

(71) Applicant: Hitachi Automotive Systems, Ltd., Hitachinaka (JP)

(72) Inventors: Kohei Matsushita, Tokyo (JP); Kisho Ashida, Tokyo (JP); Hisashi Tanie, Tokyo (JP); Yusuke Nishino, Hitachinaka (JP); Kazumoto Sano, Hitachinaka (JP); Ryota Ashizawa, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 343 days.

(21) Appl. No.: 17/252,784

(22) PCT Filed: Apr. 8, 2019

(86) PCT No.: PCT/JP2019/015360
§ 371 (c)(1),
(2) Date: Dec. 16, 2020

(87) PCT Pub. No.: WO2020/026530
PCT Pub. Date: Feb. 6, 2020

(65) Prior Publication Data
US 2021/0262538 A1    Aug. 26, 2021

(30) Foreign Application Priority Data

Jul. 30, 2018   (JP) ................... 2018-142018

(51) Int. Cl.
*F16D 55/18*    (2006.01)
*F16D 55/226*   (2006.01)
(Continued)

(52) U.S. Cl.
CPC ........... *F16D 55/226* (2013.01); *F16D 65/18* (2013.01); *F16J 9/00* (2013.01); *F16D 2125/06* (2013.01);
(Continued)

(58) Field of Classification Search
CPC .... F16D 55/226; F16D 65/18; F16D 2125/06; F16D 2125/08; F16J 9/00
See application file for complete search history.

(56) References Cited

U.S. PATENT DOCUMENTS

| 4,156,532 A | 5/1979 | Kawaguchi et al. |
| 2007/0176489 A1* | 8/2007 | Matsuura ............... F16D 55/226 303/155 |

(Continued)

FOREIGN PATENT DOCUMENTS

| DE | 10 2007 017 512 A1 | 12/2007 |
| JP | H06-042562 A | 2/1994 |

(Continued)

OTHER PUBLICATIONS

International Search Report with English translation and Written Opinion issued in corresponding application No. PCT/JP2019/015360 dated Jun. 11, 2019.

(Continued)

*Primary Examiner* — Nicholas J Lane
(74) *Attorney, Agent, or Firm* — Foley & Lardner LLP

(57) ABSTRACT

The present disclosure provides a disk brake capable of making it easier for the piston to return than conventional ones when the brake is released from a state where the brake is applied. In the disk brake, the seal groove 5 includes a front wall 51, a rear wall 52 farther from the brake rotor than the front wall 51 in the axial direction Dl, and a bottom wall 53 extending along the axial direction Dl between the rear wall 52 and the front wall 51. The bottom wall 53 includes (Continued)

a front bottom wall 53a adjacent to the front wall 51 and a rear bottom wall 53b adjacent to the rear wall 52. The rear bottom wall 53b has a depth d2 from the inner circumferential surface 42a of the cylinder 42, the depth d2 being larger than a dimension d3 of the uncompressed piston seal 6 in the direction of the depth d2 and being larger than a depth d1 from the inner circumferential surface 42a of the cylinder 42 of the front bottom wall 53a.

4 Claims, 6 Drawing Sheets

(51) Int. Cl.
    *F16D 65/18*     (2006.01)
    *F16J 9/00*     (2006.01)
    *F16D 125/06*     (2012.01)
    *F16D 125/08*     (2012.01)
    *F16D 125/40*     (2012.01)

(52) U.S. Cl.
    CPC ...... *F16D 2125/08* (2013.01); *F16D 2125/40* (2013.01)

(56) References Cited

U.S. PATENT DOCUMENTS

| | | | |
|---|---|---|---|
| 2009/0127036 A1* | 5/2009 | Langer | F16D 65/567 |
| | | | 188/218 XL |
| 2011/0240417 A1 | 10/2011 | Kono et al. | |
| 2013/0081910 A1 | 4/2013 | Chelaidite | |

FOREIGN PATENT DOCUMENTS

| | | |
|---|---|---|
| JP | H08-152032 A | 6/1996 |
| JP | 2013-079723 A | 5/2013 |
| JP | 2016-142298 A | 8/2016 |

OTHER PUBLICATIONS

Office Action issued in corresponding Chinese Application No. 201980038105.7 dated Sep. 20, 2022 with English Machine Translation (16 pages).

Office Action issued in corresponding German Patent Application No. 112019002431.0, dated Jun. 12, 2023 (7 pages).

\* cited by examiner

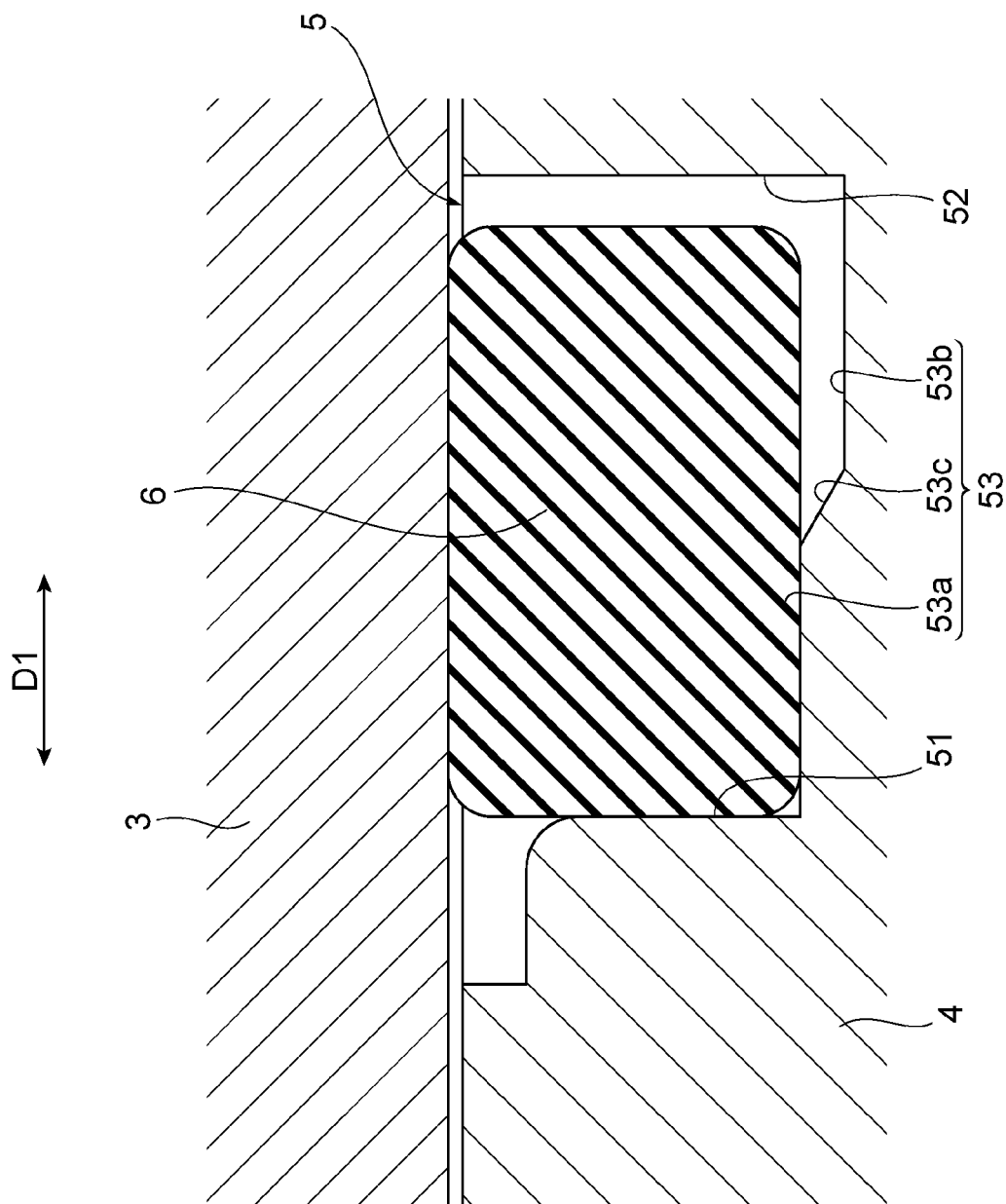

DISK BRAKE

TECHNICAL FIELD

The present disclosure relates to disk brakes.

BACKGROUND ART

Conventionally, inventions relating to vehicle disk brakes have been known (see PTL 1 below). In the vehicle disk brake described in PTL 1, a cylinder hole is provided on the working part of the caliper body with its opening on the disk rotor side, a piston seal groove is provided around the cylinder hole, a piston seal formed of a corner seal is fitted into the piston seal groove, and a piston is inserted into the cylinder hole via the piston seal. This conventional vehicle disk brake is characterized by including the following configuration (see ibid., claim 1, and the like).

The piston seal groove includes a cylinder hole opening side wall, a cylinder hole bottom portion side wall, and a bottom wall connecting the cylinder hole bottom portion side wall and the cylinder hole opening side wall. The bottom wall of the piston seal groove includes a curved portion having a parabolic cross-sectional shape in which the depth of the groove gradually becomes deeper toward the cylinder hole opening side. The piston seal in the initial state not thermally expanded is provided with a space portion to allow thermal expansion of the piston seal at least between the cylinder hole bottom portion side wall of the piston seal groove and the piston seal, and between the cylinder hole opening side of the bottom wall of the piston seal groove and the piston seal.

According to this vehicle disk brake, the thermal expansion of the piston seal can be absorbed by the cylinder hole bottom portion side and the cylinder hole opening side of the piston seal groove, and when the piston seal expands, only the cylinder hole bottom portion side is not significantly deformed. Thus, the piston can be prevented from being dragged and moved in the hydraulic chamber direction by a predetermined amount or more when the brake is released, there is no possibility that the stroke of the piston will increase during the next braking, and the brake feeling can be favorably kept (see ibid., paragraph 0010 and the like).

CITATION LIST

Patent Literature

PTL 1: JP 2016-142298 A

SUMMARY OF INVENTION

Technical Problem

In the conventional vehicle disk brake, the bottom wall of the piston seal groove includes a curved portion, whereby the depth of the groove gradually increases toward the cylinder hole opening side. In other words, the bottom wall of the piston seal groove gradually becomes shallower from the cylinder hole opening side toward the cylinder hole bottom portion side. Therefore, moving the piston from the cylinder hole bottom portion side toward the cylinder hole opening side may cause the piston seal to hinder the return of the piston when releasing the brake after pressing the friction pad against the disk rotor to apply the brake.

More specifically, when the brake is released from the braked state, the piston tends to move from the cylinder hole opening side to the cylinder hole bottom portion side. At this time, the outer circumferential surface of the piston slides with respect to the inner circumferential surface of the piston seal, and a frictional force toward the cylinder hole bottom portion side acts on the inner circumferential surface of the piston seal. Then, not only the piston seal is deformed toward the cylinder hole bottom portion side, but also the portion on the cylinder hole bottom portion side of the piston seal is compressed between the shallow bottom wall of the piston seal groove and the outer circumferential surface of the piston and is strongly pressed against the outer circumferential surface of the piston. Thus, the frictional force between the piston seal and the piston increases, which may hinder the movement of the piston toward the cylinder hole bottom portion side.

The present disclosure provides a disk brake capable of making it easier for the piston to return than conventional ones when the brake is released from a state where the brake is applied.

Solution to Problem

One aspect of the present disclosure is a disk brake including: a brake rotor; a brake pad configured to face the brake rotor; a piston configured to move the brake pad; a cylinder configured to house the piston movably in an axial direction; a seal groove provided in a circumferential direction on an inner circumferential surface of the cylinder; and a piston seal arranged in the seal groove, the piston seal configured to liquid-tightly seal a space between an outer circumferential surface of the piston and an inner circumferential surface of the cylinder. The seal groove includes: a front wall, a rear wall farther from the brake rotor than the front wall in the axial direction, and a bottom wall extending along the axial direction between the rear wall and the front wall. The bottom wall includes a front bottom wall adjacent to the front wall and a rear bottom wall adjacent to the rear wall. The rear bottom wall has a depth from the inner circumferential surface, the depth being larger than a dimension of the piston seal in an uncompressed state in a direction of the depth and being larger than a depth from the inner circumferential surface of the front bottom wall.

Advantageous Effects of Invention

According to the present disclosure, it is possible to provide a disk brake capable of making it easier for the piston to return than conventional ones when the brake is released from a state where the brake is applied.

BRIEF DESCRIPTION OF DRAWINGS

FIG. 6 is an enlarged cross-sectional view corresponding to FIG. 2 showing a second modification of the disk brake shown in FIG. 1.

DESCRIPTION OF EMBODIMENTS

Hereinafter, embodiments of the disk brake according to the present disclosure will be described with reference to the drawings.

Figure 1:
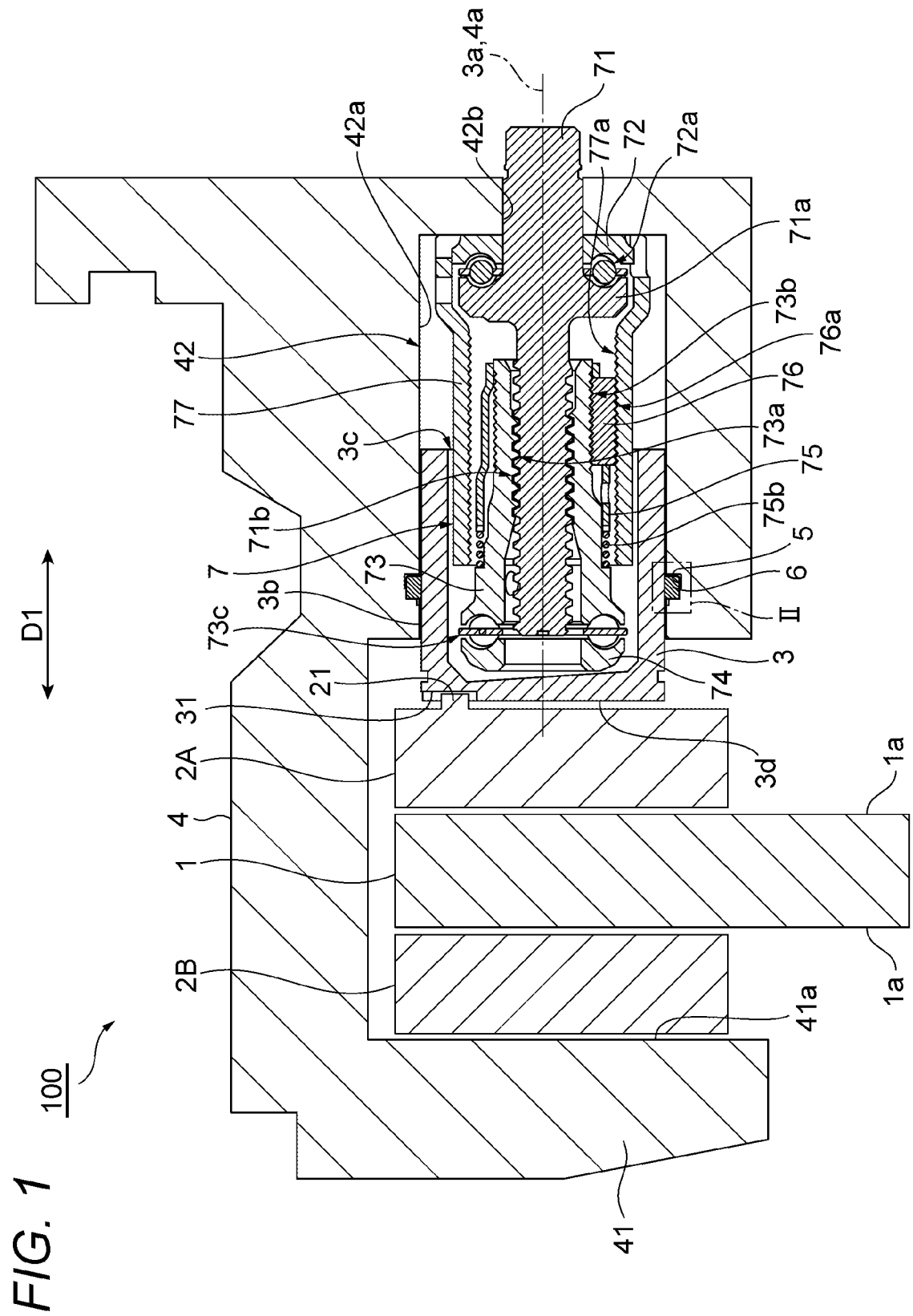
FIG. 1 is a schematic cross-sectional view of a disk brake according to an embodiment of the present disclosure.
Figure 2:
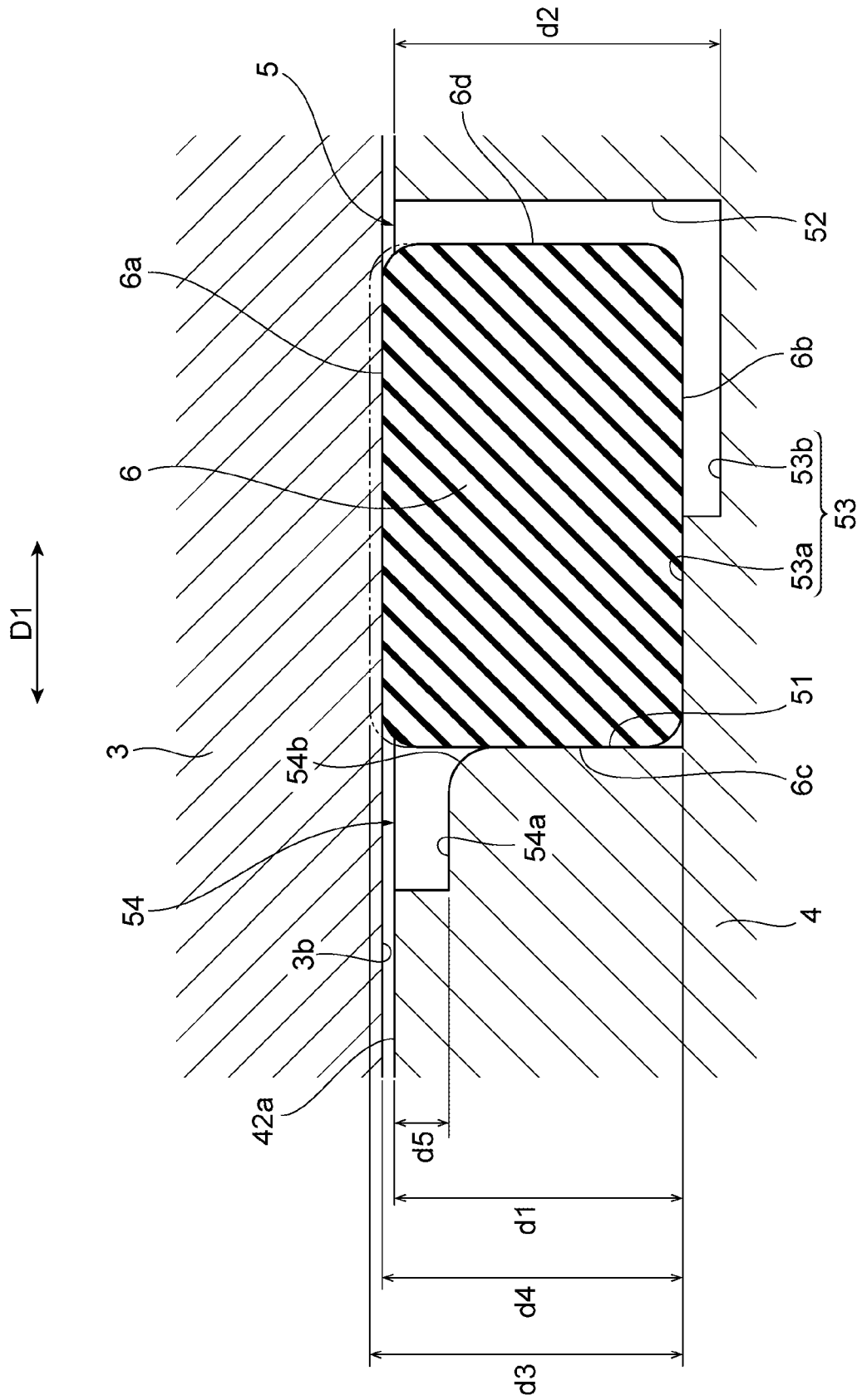
FIG. 2 is an enlarged cross-sectional view near a seal groove of the disk brake shown in FIG. 1.

FIG. 1 is a schematic cross-sectional view showing a schematic configuration of a disk brake 100 according to an embodiment of the present disclosure. FIG. 2 is an enlarged view of the part II shown in FIG. 1, and is an enlarged cross-sectional view near the seal groove 5 of the disk brake 100. The disk brake 100 of the present embodiment is, for example, a vehicle disk brake mounted on an automobile, and is mainly characterized by the following configurations.

The disk brake 100 includes a brake rotor 1, brake pads 2A and 2B, a piston 3, a seal groove 5, a cylinder 42, and a piston seal 6. The brake pads 2A and 2B are arranged to face the brake rotor 1. The piston 3 moves the brake pad 2A in the axial direction D1 along the central axis 3a. The cylinder 42 houses the piston 3 movably in the axial direction D1 along its central axis 3a. The seal groove 5 is provided in the circumferential direction on the inner circumferential surface 42a of the cylinder 42. The piston seal 6 is arranged in the seal groove 5 and liquid-tightly seals the space between the outer circumferential surface 3b of the piston 3 and the inner circumferential surface 42a of the cylinder 42.

The seal groove 5 includes a front wall 51, a rear wall 52 farther from the brake rotor 1 than the front wall 51 in the axial direction D1, and a bottom wall 53 extending along the axial direction D1 between the rear wall 52 and the front wall 51. The bottom wall 53 includes a front bottom wall 53a adjacent to the front wall 51 and a rear bottom wall 53b adjacent to the rear wall 52. The rear bottom wall 53b has a depth d2 from the inner circumferential surface 42a of the cylinder 42, the depth d2 being larger than a dimension d3 of the uncompressed piston seal 6 in the direction of the depth d2 and being larger than a depth d1 of the front bottom wall 53a from the inner circumferential surface 42a of the cylinder 42.

Hereinafter, each part of the disk brake 100 of the present embodiment will be described in more detail. The disk brake 100 includes, for example, a caliper 4 and a linear motion mechanism in addition to the above-described brake rotor 1, the brake pads 2A and 2B, the piston 3, the seal groove 5, and the piston seal 6.

The brake rotor 1 is, for example, a metal disk-shaped member attached to a hub unit of a vehicle and for rotating together with the wheel of the vehicle. A rotation axis of the brake rotor 1 is substantially perpendicular to a rotation surface 1a of the brake rotor 1 facing the brake pads 2A and 2B. It should be noted that in the disk brake 100 of the present embodiment, a rotation surface 1a facing the brake pads 2A and 2B of the brake rotor 1 may be slightly inclined with respect to the surface perpendicular to the rotation axis of the brake rotor 1 in a range not to interfere with the operation of the disk brake 100.

The brake pads 2A and 2B are supported by, for example, the caliper 4, and are arranged on both sides in the direction along the rotation axis of the brake rotor 1 so as to sandwich the brake rotor 1. One brake pad 2A is an inner brake pad arranged, for example, inward in the vehicle width direction with respect to the brake rotor 1 and moved in the axial direction D1 by the movement of the piston 3 in the axial direction D1 along the central axis 3a. The brake pad 2A includes a protruding portion 21 that engages with the recessed portion 31 of the piston 3 to prevent rotation around the central axis 3a of the piston 3. The other brake pad 2B is an outer brake pad arranged outward in the vehicle width direction with respect to the brake rotor 1.

The caliper 4 is supported, for example, by a bracket fixed to a component constituting the vehicle body. The caliper 4 includes a caliper claw portion 41 and a cylinder 42, has a U-shaped cross-sectional shape straddling the outer edge portion of the brake rotor 1, and supports brake pads 2A and 2B on both sides of the brake rotor 1.

The caliper claw portion 41 is provided, for example, at the end portion on the outer side of the caliper 4 in the vehicle width direction, and extends from the outer edge portion of the brake rotor 1 toward the center direction along the rotation surface 1a of the brake rotor 1. The caliper claw portion 41 is provided so that a flat inner side surface 41a facing the rotation surface 1a of the brake rotor 1 is substantially orthogonal to the central axis 4a of the cylinder 42 and the central axis 3a of the piston 3.

The cylinder 42 is a bottomed cylindrical recessed portion provided in the caliper 4, has a central axis 4a substantially parallel to the rotation axis of the brake rotor 1, opens toward the brake rotor 1, and houses a piston 3 movably in the axial direction D1 along the central axis 3a. The cylinder 42 includes a through hole 42b at the bottom portion. The through hole 42b is inserted with the rotating shaft 71 of the linear motion mechanism 7.

The space inside the cylinder 42 defined by the cylinder 42, the piston 3, and the linear motion mechanism 7 and sealed by the piston seal 6 is filled with the brake fluid. For example, a brake fluid conduit is connected to the cylinder 42 so that the pressure of the brake fluid in the cylinder 42 can be increased or decreased.

Figure 3:
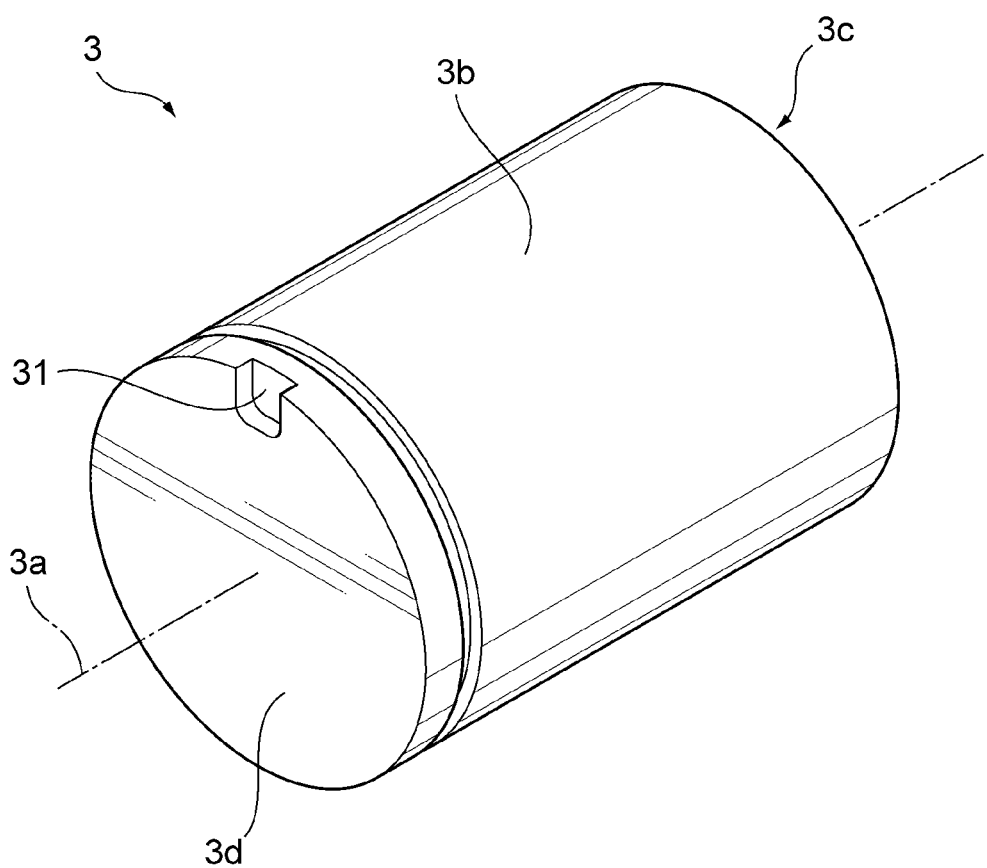
FIG. 3 is a perspective view of a piston of the disk brake shown in FIG. 1.

FIG. 3 is a perspective view of the piston 3 of the disk brake 100 shown in FIG. 1. The piston 3 is provided in a bottomed cylindrical shape, and is inserted inside the cylinder 42 with an opening portion 3c directed toward the bottom portion of the cylinder 42 so that the central axis 3a roughly coincides with the central axis 4a of the cylinder 42. The piston 3 is provided movably in the axial direction D1 along the central axis 3a with the piston seal 6 in contact with the outer circumferential surface 3b.

The piston 3 is provided so that the flat front end surface 3d being the outer surface of the bottom wall is approximately orthogonal to the central axis 3a and faces the brake pad 2A. The piston 3 includes a recessed portion 31 for engaging the protruding portion 21 of the brake pad 2A in the outer edge portion of the front end surface 3d. The front end surface 3d of the piston 3 faces the inner side surface 41a of the caliper claw portion 41 via the brake pad 2A, the brake rotor 1, and the brake pad 2B. The front end portion of the linear motion mechanism 7 is housed inside the piston 3.

The seal groove 5 is an annular groove continuously provided in the circumferential direction on the inner circumferential surface of the cylinder 42 of the caliper 4, and as described above, includes the front wall 51, the rear wall 52, and the bottom wall 53.

The front wall 51 is provided at the front end portion of the seal groove 5, that is, at the end portion on the brake rotor 1 side. The front wall 51 has, for example, a flat surface substantially parallel to the radial direction of the cylinder 42, and is always in contact with the piston seal 6 regardless of whether the brake is applied or released.

The rear wall 52 is provided at the rear end portion of the seal groove 5 farther in the axial direction D1 from the brake rotor 1 than the front wall 51. The rear wall 52 has, for example, a flat surface substantially parallel to the radial direction of the cylinder 42, and has always a gap between the rear wall 52 and the piston seal 6 regardless of whether the brake is applied or released.

The bottom wall 53 extends along the axial direction D1 between the rear wall 52 and the front wall 51. The bottom wall 53 includes a front bottom wall 53a adjacent to the front wall 51 and a rear bottom wall 53b adjacent to the rear wall 52.

The front bottom wall 53a has, for example, a cylindrical surface parallel to the axial direction D1 and is always in contact with an outer peripheral surface 6b of the piston seal 6 regardless of whether the brake is applied or released. The depth d1 from the inner circumferential surface 42a of the cylinder 42 to the front bottom wall 53a is smaller than the dimension d3 of the uncompressed piston seal 6 in the direction of the depth d1, that is, in the radial direction of the cylinder 42. In addition, the distance d4 from the outer circumferential surface 3b of the piston 3 to the front bottom wall 53a is also smaller than the dimension d3 of the piston seal 6.

The rear bottom wall 53b has, for example, a cylindrical surface parallel to the axial direction D1 and has always a gap between the rear bottom wall 53b and the outer circumferential surface 6b of the piston seal 6 regardless of whether the brake is applied or released. The depth d2 from the inner circumferential surface 42a of the cylinder 42 to the rear bottom wall 53b is larger than the dimension d3 of the uncompressed piston seal 6 in the direction of the depth d2, that is, in the radial direction of the cylinder 42.

In addition, the depth d2 from the inner circumferential surface 42a of the cylinder 42 to the rear bottom wall 53b is larger than the depth d1 from the inner circumferential surface 42a of the cylinder 42 to the front bottom wall 53a. Thus, a step in the radial direction of the cylinder 42, that is, in the depth direction of the seal groove 5 is formed between the front bottom wall 53a and the rear bottom wall 53b.

The seal groove 5 has a shallow groove portion 54 in front of the front wall 51, that is, on the brake rotor 1 side. The depth d5 from the inner circumferential surface 42a of the cylinder 42 to the bottom wall 54a of the shallow groove portion 54 is smaller than the depth d1 from the inner circumferential surface 42a of the cylinder 42 to the front bottom wall 53a. The shallow groove portion 54 forms a space for the piston seal 6 to elastically deform toward the brake rotor 1. In addition, the bottom wall 54a of the shallow groove portion 54 and the front wall 51 are connected to each other via a smooth curved surface 54b.

The piston seal 6 is an elastic body made of resin such as rubber, and is arranged in the seal groove 5. The piston seal 6 is, for example, an annular member having a substantially rectangular cross-sectional shape. The piston seal 6 is elastically deformed by being compressed in the radial direction in a state of being arranged in the seal groove 5 and of the piston 3 being arranged inner side. In the piston seal 6, the inner circumferential surface 6a is in contact with the outer circumferential surface 3b of the piston 3, and the outer circumferential surface 6b is in contact with the front bottom wall 53a of the seal groove 5, whereby the space between the outer circumferential surface 3b of the piston 3 and the inner circumferential surface 42a of the cylinder 42 is liquid-tightly sealed.

In addition, regarding the piston seal 6, in the axial direction D1 along the central axis 4a of the cylinder 42, the front end surface 6c on the brake rotor 1 side is in contact with the front wall 51 of the seal groove 5, and there is a gap between the rear end surface 6d on the bottom portion side of the cylinder 42 and the rear wall 52 of the seal groove 5. In addition, regarding the piston seal 6, in the depth direction of the seal groove 5, that is, in the radial direction of the cylinder 42, there is a gap between the rear end portion of the outer circumferential surface 6b of the piston seal 6, that is, the portion on the rear wall 52 side, and the rear bottom wall 53b of the seal groove 5.

That is, the disk brake 100 of the present embodiment has a configuration in which, for example, in a state of the piston 3 advancing in the axial direction D1 toward the brake rotor 1 and the brake pad 2A in contact with the brake rotor 1, the piston seal 6 is in contact with the front bottom wall 53a and the outer circumferential surface 3b of the piston 3, and a gap is formed between the piston seal 6 and the rear bottom wall 53b.

In addition, the disk brake 100 of the present embodiment has a configuration in which, for example, in a state of the piston 3 advancing in the axial direction D1 toward the brake rotor 1 and the brake pad 2A in contact with the brake rotor 1, a gap is formed between the piston seal 6 and the rear wall 52.

This configuration can be achieved by performing a three-dimensional simulation on a computer based on the shape, dimensions, and friction coefficient of the seal groove 5, and the elastic modulus, shape, dimensions, friction coefficient, and the like of the piston seal 6, for example.

Figure 4:
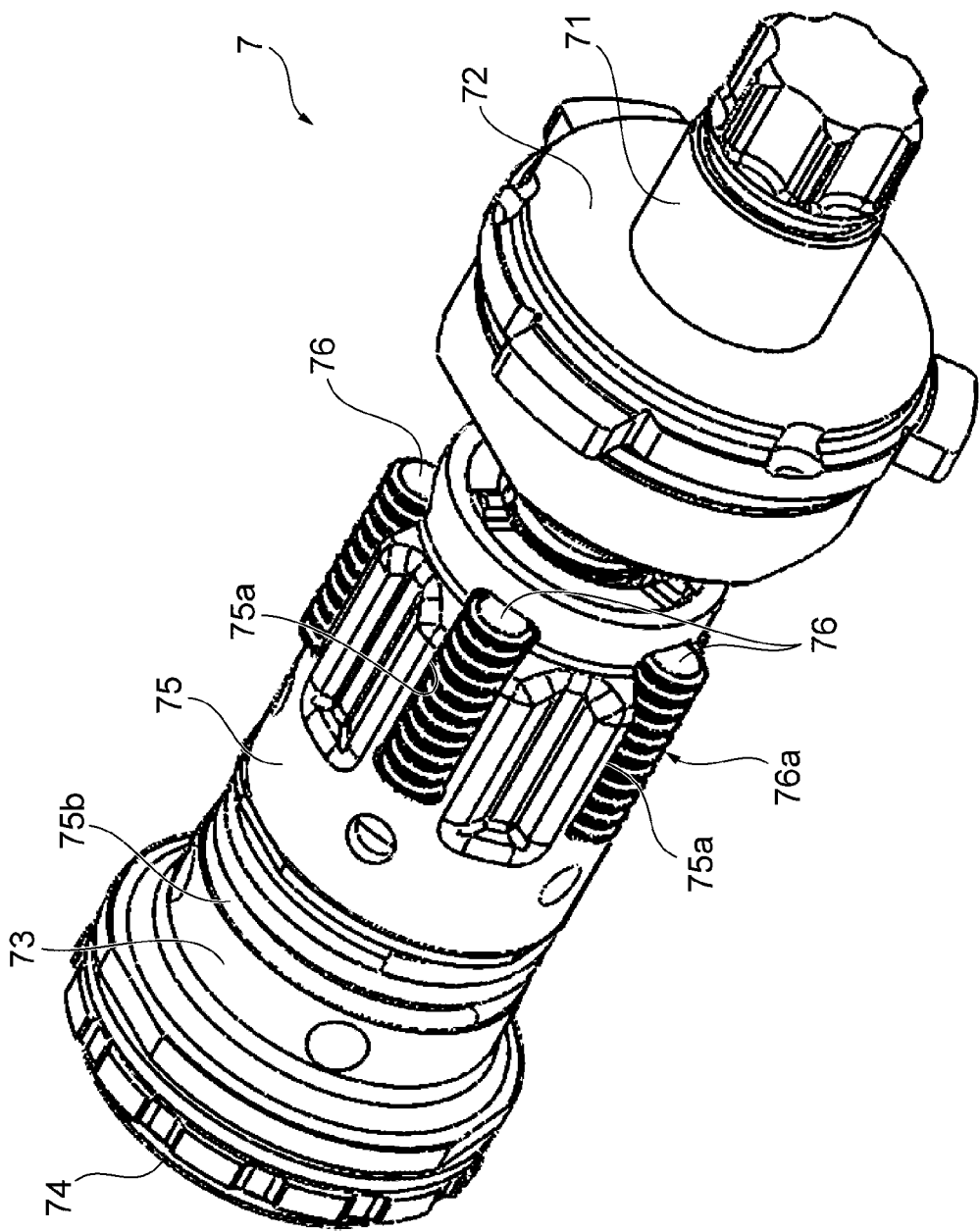
FIG. 4 is a perspective view of a linear motion mechanism of the disk brake shown in FIG. 1.

FIG. 4 is a perspective view of the linear motion mechanism 7 of the disk brake 100 shown in FIG. 1. It should be noted that FIG. 4 shows a state in which the nut roller 77 of the linear motion mechanism 7 is removed in order to facilitate understanding of the internal structure of the linear motion mechanism 7. The linear motion mechanism 7 includes, for example, a rotating shaft 71, a rear end plate 72, a shaft roller 73, a front end plate 74, a cage roller 75, a roller 76, and a nut roller 77.

The rotating shaft 71 has a rear end portion inserted into the through hole 42b of the caliper 4, is connected to the rotating shaft of the motor via, for example, a gear unit, and rotates around an axis coincident with the central axis 4a of the cylinder 42. The rotating shaft 71 extends from the rear end portion toward the bottom portion of the piston 3 in the axial direction D1 along the central axis 4a of the cylinder 42. The rotating shaft 71 includes a flange portion 71a facing the rear end plate 72 inside the cylinder 42, and a male threaded portion 71b provided on the outer circumferential surface on the front end side of the flange portion 71a.

The rear end plate 72 is a disk-shaped member having a through hole through which the rotating shaft 71 is inserted, is arranged at the bottom portion of the cylinder 42, and is fixed to the bottom portion of the cylinder 42 by, for example, a pin (not shown). The rear end plate 72 faces the flange portion 71a of the rotating shaft 71 via a thrust bearing 72a, and rotatably supports the rotating shaft 71.

The shaft roller 73 is a cylindrical member whose tip portion is expanded in diameter as compared with the rear end portion, includes on the inner circumferential surface a female threaded portion 73a for being screwed onto the male threaded portion 71b of the rotating shaft 71, and includes an annular uneven portion 73b formed in the circumferential direction on the outer circumferential surface. The front end portion of the shaft roller 73 supports the front end plate 74 via a thrust bearing 73c.

The front end plate 74 is supported by the front end portion of the shaft roller 73 via the thrust bearing 73c, and faces the bottom portion of the piston 3. That is, the front end plate 74 comes into contact with the bottom portion of the piston 3 without rotating even if the shaft roller 73 rotates.

The cage roller 75 is a cylindrical member whose front end portion is expanded in diameter as compared with the rear end portion, and is arranged on the outer circumference of a portion on the rear end side of the shaft roller 73. The cage roller 75 includes a plurality of elongated hole-shaped opening portions 75a at intervals in the circumferential direction. The opening portion 75a extends in the axial direction D1 along the central axis 4a of the cylinder 42 from the rear end portion toward the front end portion of the cage roller 75. The cage roller 75 includes a spring 75b at the front end portion. The spring 75b is engaged with the front end portion of the shaft roller 73 and urges the cage roller 75 toward the bottom portion of the cylinder 42.

The roller 76 is a cylindrical-shaped member including an annular uneven portion 76a formed in the circumferential direction on the outer circumferential surface, and is rotatably arranged in the opening portion 75a of the cage roller 75 around the central axis. The annular uneven portion 76a on the outer circumferential surface of the roller 76 is engaged with the annular uneven portion 73b on the outer circumferential surface of the shaft roller 73 and the female threaded portion 77a on the inner circumferential surface of the nut roller 77.

The respective rollers 76 are arranged in a plurality of opening portions 75a provided at intervals in the circumferential direction of the cage roller 75. The roller 76 receives force in the direction toward the bottom portion of the piston 3 from the opening portion 75a of the cage roller 75 urged toward the bottom portion of the piston 3 by the spring 75b.

The nut roller 77 is a cylindrical member whose rear end portion is expanded in diameter as compared with the tip portion, and the rear end plate 72 is held and fixed inside the rear end portion. The nut roller 77 includes a female threaded portion 77a for engaging the annular uneven portion 76a on the outer circumferential surface of the roller 76 with the inner peripheral surface on the inner circumferential surface on the tip side of the rear end portion.

Next, the operation of the disk brake 100 of the present embodiment will be described.

The disk brake 100 can apply the brake by increasing the pressure of the brake fluid in the cylinder 42, and can release the brake by decreasing the pressure of the brake fluid in the cylinder 42. More specifically, when the pressure of the brake fluid in the cylinder 42 rises during hydraulic braking using hydraulic pressure, the piston 3 advances in the axial direction D1 toward the brake rotor 1, and the brake pad 2A is pressed against the brake rotor 1.

Thus, the brake rotor 1 is sandwiched between the brake pads 2A and 2B to generate frictional heat, and the kinetic energy is converted into heat energy to apply the brakes. At this time, in addition to the outer circumferential surface 3b of the piston 3 advancing toward the brake rotor 1 sliding with respect to the inner circumferential surface 6a of the piston seal 6, the piston seal 6 is elastically deformed toward the brake rotor 1 due to the increase in the pressure of the brake fluid.

Thereafter, when the pressure of the brake fluid in the cylinder 42 drops, the piston 3 retreats in the axial direction D1 toward the bottom portion of the cylinder 42, the brake pads 2A and 2B are separated from the brake rotor 1, and the brake is released. At this time, in addition to the outer circumferential surface 3b of the piston 3 retreating toward the bottom portion of the cylinder 42 sliding with respect to the inner circumferential surface 6a of the piston seal 6, the elastic deformation of the piston seal 6 is restored due to the drop in brake fluid pressure, and the piston seal 6 returns to the position before applying the brake.

In addition, the disk brake 100 can apply the brake or release the brake depending on the operation of the linear motion mechanism 7. More specifically, the electronic control unit (ECU) of the vehicle rotates the motor, and rotates the rotating shaft 71 of the linear motion mechanism 7 via the gear unit. Then, the shaft roller 73 including the female threaded portion 73a screwed to the male threaded portion 71b of the rotating shaft 71 advances in the axial direction D1 toward the bottom portion of the piston 3. Then, the front end plate 74 supported by the front end portion of the shaft roller 73 via the thrust bearing 73c applies a force toward the brake rotor 1 to the bottom portion of the piston 3.

Thus, the piston 3 advances in the axial direction D1 toward the brake rotor 1, and the brake pad 2A is pressed against the brake rotor 1. As a result, the brake rotor 1 is sandwiched between the brake pads 2A and 2B to generate frictional heat, and the kinetic energy is converted into heat energy to apply the brakes. At this time, the outer circumferential surface 3b of the piston 3 advancing toward the brake rotor 1 slides with respect to the inner circumferential surface 6a of the piston seal 6, whereby the piston seal 6 is elastically deformed toward the brake rotor 1.

Thereafter, the ECU rotates the motor, and rotates, via the gear unit, the rotating shaft 71 of the linear motion mechanism 7 in the direction opposite to the rotating direction when the brake is applied. Then, the shaft roller 73 including the female threaded portion 73a screwed to the male threaded portion 71b of the rotating shaft 71 retreats in the axial direction D1 toward the bottom portion of the cylinder 42, and the piston 3 retreats in the axial direction D1 toward the bottom portion of the cylinder 42 due to the elastic force due to the elastic deformation of the piston seal 6. Thus, the brake pads 2A and 2B are separated from the brake rotor 1 and the brake is released.

Thus, when the brake is applied by the linear motion mechanism 7 and then the brake is released, unlike during the hydraulic braking using the hydraulic pressure of the brake fluid, the effect of restoring the elastic deformation of the piston seal 6 due to the drop in hydraulic pressure cannot be obtained. Therefore, in the conventional disk brake using the linear motion mechanism, the piston does not sufficiently retreat even after the brake is released, and the brake pad comes into contact with the brake rotor, which may deteriorate the fuel efficiency of the vehicle.

In contrast to this, as described above, the disk brake 100 of the present embodiment includes: a brake rotor 1, a brake pad 2A facing the brake rotor 1, a piston 3 that moves the brake pad 2A, a cylinder 42 that movably houses the piston 3 in the axial direction D1, a seal groove 5 provided in the circumferential direction on the inner circumferential surface 42a of the cylinder 42, and a piston seal 6 arranged in the seal groove 5 and liquid-tightly sealing a space between the outer circumferential surface 3b of the piston 3 and the inner circumferential surface 42a of the cylinder 42. The seal groove 5 includes a front wall 51, a rear wall 52 farther from the brake rotor 1 than the front wall 51 in the axial direction D1, and a bottom wall 53 extending along the axial direction D1 between the rear wall 52 and the front wall 51. The bottom wall 53 includes a front bottom wall 53a adjacent to the front wall 51 and a rear bottom wall 53b adjacent to the rear wall 52. Then, the rear bottom wall 53b has a depth d2 from the inner circumferential surface 42a of the cylinder 42, the depth d2 being larger than a dimension d3 of the uncompressed piston seal 6 in the direction of the depth d2 and being larger than a depth d1 from the inner circumferential surface 42a of the cylinder 42 of the front bottom wall 53a.

With this configuration, it is possible to prevent the rear end portion of the piston seal 6, that is, the end portion on the bottom portion side of the cylinder 42 from being elastically deformed in the radial direction of the cylinder 42. Therefore, the surface pressure between the rear end portion of the inner circumferential surface 6a of the piston seal 6 and the outer circumferential surface 3b of the piston 3 can be reduced, and the frictional force acting between the rear end portion of the inner circumferential surface 6a of the piston seal 6 and the outer circumferential surface 3b of the piston 3 can be reduced. Thus, the piston seal 6 elastically deformed toward the brake rotor 1 can be easily restored toward the bottom portion of the cylinder 42. Therefore, according to the present embodiment, it is possible to provide a disk brake 100 capable of making it easier for the piston 3 to return than before when the brake is released from the state in which the brake is applied by the linear motion mechanism 7. As a result, it is possible to prevent the brake pad 2A from coming into a state of being in contact with the brake rotor 1 after the brake is released, and to prevent the fuel efficiency of the vehicle from deteriorating.

In addition, in the disk brake 100 of the present embodiment, in a state of the piston 3 advancing in the axial direction D1 toward the brake rotor 1 and the brake pad 2A in contact with the brake rotor 1, a gap is formed between the piston seal 6 and the rear wall 52 of the seal groove 5. That is, a gap is formed between the piston seal 6 and the rear wall 52 of the seal groove 5 immediately after the brake is released from the state where the brake is applied.

With this configuration, the piston seal 6 does not receive a reaction force from the bottom wall 53 of the seal groove 5, and the piston seal 6 elastically deformed toward the brake rotor 1 can be easily restored toward the bottom portion of the cylinder 42. Therefore, the piston 3 can be more easily returned toward the bottom portion of the cylinder 42.

In addition, in the disk brake 100 of the present embodiment, in a state of the piston 3 advancing in the axial direction D1 toward the brake rotor 1 and the brake pad 2A in contact with the brake rotor 1, the piston seal 6 is in contact with the front bottom wall 53a of the seal groove 5 and the outer circumferential surface 3b of the piston 3, and a gap is formed between the piston seal 6 and the rear bottom wall 53b of the seal groove 5. That is, immediately after the brake is released from the state where the brake is applied, the piston seal 6 is in contact with the front bottom wall 53a of the seal groove 5 and the outer circumferential surface 3b of the piston 3, and a gap is formed between the piston seal 6 and the rear bottom wall 53b of the seal groove 5.

With this configuration, the piston seal 6 comes into contact with the front bottom wall 53a of the seal groove 5 and the outer circumferential surface 3b of the piston 3 while the brake is applied, whereby the space between the outer circumferential surface 3b of the piston 3 and the inner circumferential surface 42a of the cylinder 42 is liquid-tightly sealed by the piston seal 6. When the brake is released from this state, the restoring force of the piston seal 6 causes the piston 3 to retreat toward the bottom portion of the cylinder 42.

At this time, since a gap is formed between the piston seal 6 and the rear bottom wall 53b of the seal groove 5, the piston seal 6 does not receive a reaction force from the rear bottom wall 53b of the seal groove 5. Thus, the piston seal 6 elastically deformed toward the brake rotor 1 can be easily restored toward the bottom portion of the cylinder 42, and the piston 3 can be more easily returned toward the bottom portion of the cylinder 42.

In addition, in the disk brake 100 of the present embodiment, a case is assumed where the rotation surface 1a facing the brake pads 2A and 2B of the brake rotor 1 is inclined with respect to the surface perpendicular to the rotation axis of the brake rotor 1. In this case, the rotation of the brake rotor 1 causes the rotation surface 1a to be shaken in the axial direction D1.

More specifically, in the above case, the rotation of the brake rotor 1 causes a shake that the rotation surface 1a of the brake rotor facing the brake pad 2A reciprocates in the axial direction D1. Due to the shake of the rotation surface 1a of the brake rotor immediately after the brake is released, the brake pad 2A is pushed in the direction away from the brake rotor 1 by the rotation surface 1a, and the piston 3 is pushed toward the bottom portion of the cylinder 42 by the brake pad 2A. Thus, the piston 3 can be more easily returned toward the bottom portion of the cylinder 42.

As described above, according to the present embodiment, when the brake is released from the state in which the brake is applied, it is possible to provide a disk brake 100 capable of making the piston 3 easier to return than before. It should be noted that the disk brake according to the present disclosure is not limited to the configuration of the disk brake 100 described in the present embodiment. Hereinafter, some modifications of the disk brake 100 of the present embodiment will be described.

Figure 5:
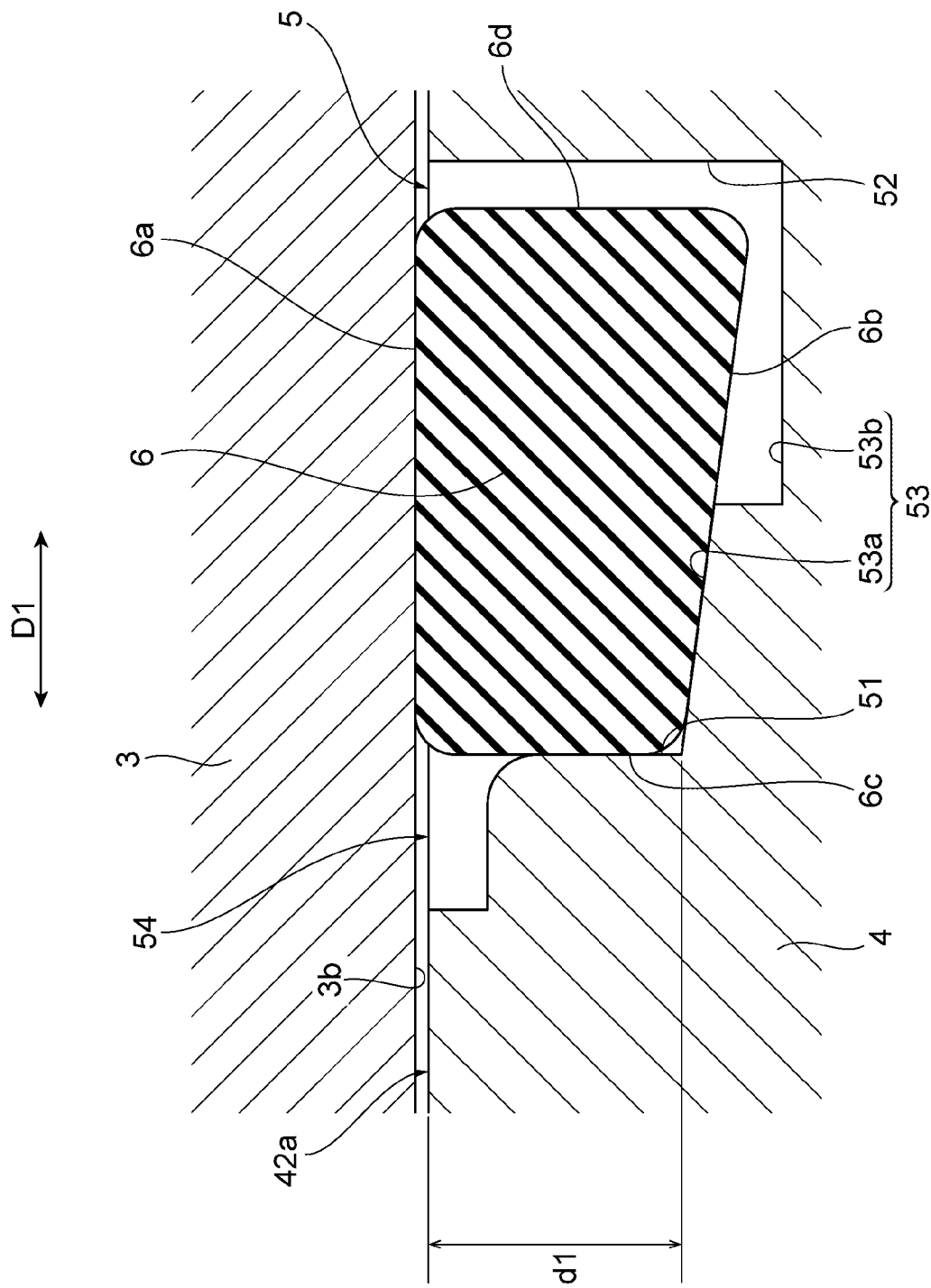
FIG. 5 is an enlarged cross-sectional view corresponding to FIG. 2 showing a first modification of the disk brake shown in FIG. 1.

FIG. 5 is an enlarged cross-sectional view corresponding to FIG. 2 showing a first modification of the disk brake 100 according to the above-described embodiment. In the disk brake according to the present modification, the front bottom wall 53a of the seal groove 5 is inclined with respect to the axial direction D1 so that the depth d1 from the inner circumferential surface 42a of the cylinder 42 gradually increases from the front wall 51 toward the rear wall 52.

With this configuration, the elastic deformation of the piston seal 6 in the radial direction of the cylinder 42 can be reduced from the front wall 51 toward the rear wall 52, and the surface pressure between the inner circumferential surface 6a of the piston seal 6 and the outer circumferential surface 3b of the piston 3 can be reduced from the front wall 51 toward the rear wall 52. Thus, the frictional force acting between the front end portion on the front wall 51 side of the inner circumferential surface 6a of the piston seal 6 and the outer circumferential surface 3b of the piston 3 can be reduced. In addition, the piston seal 6 elastically deformed toward the brake rotor 1 can be more easily restored toward the bottom portion of the cylinder 42. Therefore, according to the present modification, it is possible to provide a disk brake capable of making it easier for the piston 3 to return when the brake is released from the state in which the brake is applied by the linear motion mechanism 7.

FIG. 6 is an enlarged cross-sectional view corresponding to FIG. 2 showing a second modification of the disk brake 100 according to the above-described embodiment. In the disk brake according to the present modification, the bottom wall 53 of the seal groove 5 has an inclined surface 53c between the front bottom wall 53a and the rear bottom wall 53b. With this configuration, the angle of the corner portion between the front bottom wall 53a and the inclined surface 53c can be made an obtuse angle, and damage to the piston seal 6 can be prevented.

As described above, the embodiment of the disk brake according to the present disclosure has been described in detail with reference to the drawings, but the concrete configuration is not limited to this embodiment, and any design change or the like in a scope without departing from the gist of the present disclosure is included in the present disclosure.

REFERENCE SIGNS LIST 1 brake rotor
1a rotation surface (surface facing brake pad)
2A brake pad
3 piston
3b outer circumferential surface
42 cylinder
42a inner circumferential surface
5 seal groove
51 front wall
52 rear wall
53 bottom wall
53a front bottom wall
53b rear bottom wall
6 piston seal
100 disk brake
D1 axial direction
d1 depth of front bottom wall
d2 depth of rear bottom wall
d3 dimension of piston seal

The invention claimed is:

1. A disk brake comprising:
a brake rotor;
a brake pad configured to face the brake rotor;
a piston configured to move the brake pad;
a cylinder configured to house the piston movably in an axial direction;
a seal groove provided in a circumferential direction on an inner circumferential surface of the cylinder; and
a piston seal arranged in the seal groove, the piston seal configured to liquid-tightly seal a space between an outer circumferential surface of the piston and an inner circumferential surface of the cylinder,
wherein the seal groove includes: a front wall, a rear wall farther from the brake rotor than the front wall in the axial direction, and a bottom wall extending along the axial direction between the rear wall and the front wall,
wherein the bottom wall includes a front bottom wall adjacent to the front wall, a rear bottom wall adjacent to the rear wall, and an inclined surface between and contacting the front bottom wall and the rear bottom wall, the front bottom wall and the rear bottom wall being parallel to each other and without inclination, and
wherein the rear bottom wall has a depth from the inner circumferential surface, the depth being larger than a dimension of the piston seal in an uncompressed state in a direction of the depth and being larger than a depth from the inner circumferential surface of the front bottom wall.

2. The disk brake according to claim 1, wherein in a state of the piston advancing in the axial direction toward the brake rotor and the brake pad in contact with the brake rotor, a gap is formed between the piston seal and the rear wall.

3. The disk brake according to claim 1, wherein in a state of the piston advancing in the axial direction toward the brake rotor and the brake pad in contact with the brake rotor, the piston seal is in contact with the front bottom wall and an outer circumferential surface of the piston, and a gap is formed between the piston seal and the rear bottom wall.

4. The disk brake according to claim 1, wherein a surface facing the brake pad of the brake rotor is inclined with respect to a surface perpendicular to a rotation axis of the brake rotor.

* * * * *